United States Patent
Lin et al.

(10) Patent No.: US 9,285,664 B2
(45) Date of Patent: Mar. 15, 2016

(54) OPTICAL APPARATUS HAVING LIGHT SOURCES AND A PLURALITY OF HOLDERS FOR HOLDING THE LIGHT SOURCES

(71) Applicant: LITE-ON IT CORPORATION, Taipei (TW)

(72) Inventors: Wei-Chih Lin, Hsinchu (TW); Chih-Chien Lu, Hsinchu (TW); Meng-Che Lin, Hsinchu (TW); Chuan Lee, Hsinchu (TW); Chia-Yuan Lin, Hsinchu (TW); Cheng-Chung Hsu, Hsinchu (TW); Yoshio Hayashi, Hsinchu (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 433 days.

(21) Appl. No.: 13/737,953

(22) Filed: Jan. 10, 2013

(65) Prior Publication Data

US 2014/0152963 A1 Jun. 5, 2014

(30) Foreign Application Priority Data

Dec. 4, 2012 (CN) .......................... 2012 1 0511386

(51) Int. Cl.
*G03B 21/14* (2006.01)
*G03B 21/20* (2006.01)
*G03B 43/00* (2006.01)

(52) U.S. Cl.
CPC ........ *G03B 21/2013* (2013.01); *G03B 21/2046* (2013.01); *G03B 43/00* (2013.01)

(58) Field of Classification Search
CPC ...... G03B 21/14; G03B 21/145; G03B 21/20; G03B 21/2013; G03B 21/2033; G03B 21/2046; G03B 21/208; H04N 9/31; H04N 9/3141; H04N 9/3152; H04N 9/3161; H04N 9/3164

See application file for complete search history.

(56) References Cited

U.S. PATENT DOCUMENTS

| | | | |
|---|---|---|---|
| 6,183,092 B1* | 2/2001 | Troyer ............................ | 353/31 |
| 7,152,982 B2* | 12/2006 | Kitabayashi et al. ......... | 353/119 |
| 7,367,682 B2* | 5/2008 | Dvorkis et al. ................ | 353/101 |
| 7,883,214 B2* | 2/2011 | He et al. .......................... | 353/69 |
| 8,113,660 B1* | 2/2012 | Troyer ............................ | 353/31 |
| 8,215,779 B2* | 7/2012 | Takezawa ........................ | 353/87 |
| 2005/0068503 A1* | 3/2005 | Imade .................... | G03B 21/16 353/31 |
| 2006/0262371 A1* | 11/2006 | Tan ....................... | H04N 9/3129 359/204.3 |
| 2010/0014058 A1* | 1/2010 | Imai ............................... | 353/98 |
| 2011/0102747 A1* | 5/2011 | Lee et al. ........................ | 353/31 |
| 2011/0304828 A1* | 12/2011 | Khechana et al. ............. | 353/20 |

* cited by examiner

*Primary Examiner* — Sultan Chowdhury
(74) *Attorney, Agent, or Firm* — Jianq Chyun IP Office

(57) ABSTRACT

An optical apparatus comprises a fixing base; a plurality of light emitting units and a plurality of holders. The light emitting units emits a plurality of light beams and each light emitting unit has a holding portion. Each holder has an accommodating indentation for accommodating the corresponding light emitting unit. The accommodating indentation exposes the holding portion of the corresponding light emitting unit so that a jig holds the exposed holding portion and adjusts the position of the holder and the light emitting unit before the holder is fixed to the fixing base and then adjusts the position of the light emitting unit within the holder after the holder is fixed to the fixing base. And then the light emitting unit is fixed to the holder.

13 Claims, 7 Drawing Sheets

OPTICAL APPARATUS HAVING LIGHT SOURCES AND A PLURALITY OF HOLDERS FOR HOLDING THE LIGHT SOURCES

CROSS-REFERENCE TO RELATED APPLICATION

This application claims the priority benefit of China application serial no. 201210511386.3, filed on Dec. 4, 2012. The entirety of the above-mentioned patent application is hereby incorporated by reference herein and made a part of this specification.

BACKGROUND

1. Field of the Invention

The invention relates to an aligning method and an optical apparatus.

2. Description of Related Art

In recent years, as consumer demands for portable video devices gradually increase, video systems have been trending towards miniaturization. Wherein, a pico-projector technology enables the volumes of the video systems to be further minimized, and therefore has an extreme market potential. In the pico-projector technology, a micro electro mechanical system (MEMS) adopting a laser light source has advantages of high image luminance, small volume and less susceptible to a limitation in projection distance, and therefore may be applied to portable products, such as a mobile phone, a laptop, a tablet computer, a camera, a video recorder, a portable media player (PMP) and so forth. However, since the volume of the pico-projector is small, optical light paths must be adjusted in a limited space, so that light beams of a plurality of laser light sources (e.g., laser light sources of three primary colors: red, blue and green) are almost coaxial, and light spots are concentrated, thereby achieving projection screen resolution requirements. Nevertheless, multiple degrees of freedom are involved when adjusting the optical axis of the laser light sources, and therefore, the required jigs and adjustment procedure are overly complicated, so that the pico-projector is difficult to be mass produced, and has higher production costs. At the same time, as a size and a distance of the projection screen become larger, the laser light source with increased power consumption is also easily prone to have a problem of being overheat due to a poor heat dissipation. Therefore, how to simplify the alignment procedure of the optical axis and the jigs for attaining a possibility of mass production, lowering the production costs and solving the heat dissipation problem is currently one of the pressing concerns.

SUMMARY OF THE INVENTION

The invention provides an aligning method capable of simplifying an optical alignment procedure and still having ideal alignment precision.

The invention provides an optical apparatus having ideal optical alignment accuracy and is easy used in an optical alignment.

The invention provides an aligning method including the following steps. A plurality of lenses and a beam combining unit are fixed in a fixing base. A plurality of light emitting units is respectively disposed in a plurality of holders. The holders are leaning on the fixing base, and locations of the light emitting units are respectively corresponded to locations of the lenses. The light emitting units are turned on, and light beams respectively emitted by the light emitting units are enabled to be combined by the beam combining unit after respectively passing through the lenses. Moreover, positions of at least part of the light emitting units are respectively adjusted by using at least one jig to respectively hold the at least part of the light emitting units until an overlapping degree of the light beams combined by the beam combining unit matches a preset requirement.

In an embodiment of the invention, the step of adjusting the position of any light emitting unit in the at least part of the light emitting units includes at least one of a vertical adjustment and a horizontal adjustment. The vertical adjustment is to use the jig to adjust a position of the light emitting unit within the corresponding holder so as to adjust a distance between the light emitting unit and the corresponding lens. The horizontal adjustment is to use the jig to adjust an offset of an optical axis of the light emitting unit with respect to an optical axis of the corresponding lens, so that the holder corresponded to the light emitting unit glides on the fixing base.

In an embodiment of the invention, each light emitting unit has a holding portion, and a method of respectively adjusting the positions of the at least part of the light emitting units by using the jig includes respectively holding the holding portions of the light emitting units. Moreover, a method of adjusting the position of any light emitting unit in the at least part of the light emitting units is achieved by moving the corresponding jig.

In an embodiment of the invention, the aligning method further includes deciding whether the overlapping degree of the light beams combined by the beam combining unit matches the preset requirement by determining the overlapping degree of a plurality of light spots respectively projected on a reference plane by the light beams combined by the beam combining unit.

In an embodiment of the invention, aligning method further includes fixing the holders on the fixing base, and respectively fixing the light emitting units within the holders, when the overlapping degree of the light beams combined by the beam combining unit matches the preset requirement.

In an embodiment of the invention, the light beams are polarized light beams, and light spots formed by the light beams on reference plane are elliptical.

In an embodiment of the invention, the lenses are a plurality of light collimators, and the light collimators respectively collimate the light beams from the light emitting units.

In an embodiment of the invention, a diameter of the lenses is D, a distance from the lenses to the beam combining unit is L, and a relationship between the lenses and the beam combining unit satisfies:

$$L < \frac{D}{2}.$$

In an embodiment of the invention, the beam combining unit includes a plurality of beam splitters respectively disposed on transmission paths of the light beams from the lenses.

In an embodiment of the invention, the light emitting units respectively emit light beams of different colors, the beam splitters are a plurality of color filter components, and the color filter components respectively reflect the light beams of corresponding colors and let through the light beams of other colors.

In an embodiment of the invention, the light emitting units are laser diodes.

The invention provides an optical apparatus including a fixing base, a plurality of lenses, a beam combining unit, a plurality of light emitting units and a plurality of holders. The lenses and the beam combining unit are fixed on the fixing base. The light emitting units emit a plurality of light beams, and the light beams are combined by the beam combining unit after respectively passing through the lenses, wherein each light emitting unit has a holding portion. The holders are fixed at a side of the fixing base and respectively hold the light emitting units, each holder has an accommodating indentation for accommodating the corresponding light emitting unit, and each holder exposes the holding portion of the corresponding light emitting unit.

In an embodiment of the invention, the optical apparatus further includes a scanning mirror group having at least one scanning mirror. The scanning mirror is disposed on transmission paths of the light beams combined by the beam combining unit, and a plurality of light spots formed on the scanning mirror group by the light beams are close to each other, the scanning mirror enables the light beams to scan an image surface by changing angles.

In an embodiment of the invention, the optical apparatus further includes at least one reflector. The reflector is disposed on the transmission paths of the light beams combined by the beam combining unit and located between the beam combining unit and the scanning mirror, so as to reflect the light beams to the scanning mirror.

In an embodiment of the invention, the reflector is fixed on the fixing base.

In an embodiment of the invention, materials of the fixing base and the holders are metal.

According to the foregoing, the aligning method in the embodiment of the invention fixes the lenses and the beam combining unit via the fixing base to simplify the adjustment of optical paths, and then uses one or more jig to respectively hold the at least part of the light emitting units to adjust the positions of the light emitting units, so that the overlapping degree of the light beams matches the preset requirement; and thereby, the alignment process may be simplified and an amount of jig in need may be reduced while maintaining ideal alignment precision. In the optical apparatus of the embodiment of the invention, since each holder exposes the holding portion of the corresponding light emitting unit, the jig may hold the holding portion of the light emitting unit so as to adjust the position of the light emitting unit, so that the optical alignment process may be simplified while still maintaining ideal alignment precision.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
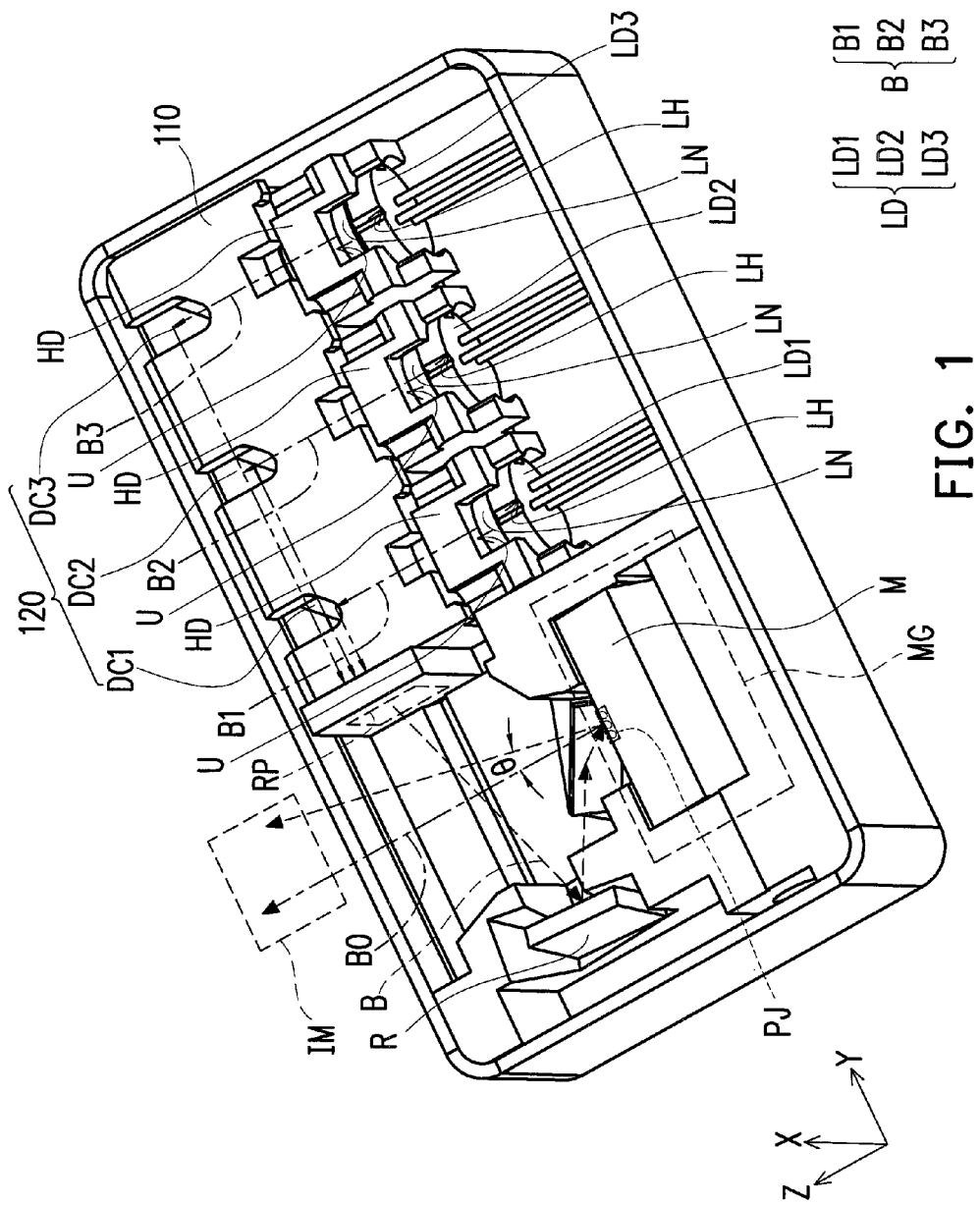
FIG. 1 is a schematic diagram illustrating an optical apparatus according to an embodiment of the invention.
Figure 2:
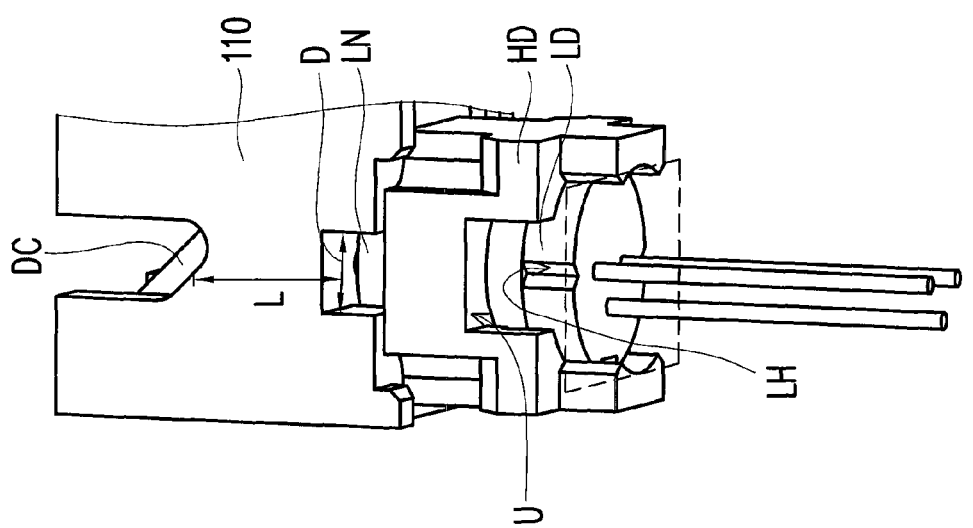
FIG. 2 is a partial enlarged diagram of the optical apparatus according to the embodiment depicted in FIG. 1.

FIG. 1 is a schematic diagram illustrating an optical apparatus according to an embodiment of the invention. FIG. 2 is a partial enlarged diagram of the optical apparatus according to the embodiment depicted in FIG. 1. Referring to FIG. 1 and FIG. 2, in this embodiment, the optical apparatus 100 may include a fixing base 110, a plurality of lenses LN, a beam combining unit 120, a plurality of light emitting units LD and a plurality of holders HD.

The lenses LN and the beam combining unit 120 are fixed on the fixing base 110. In this embodiment, an amount of the light emitting unit LD is three, and the light emitting unit may be a laser diode, but the invention is not limited thereto. In other embodiments, the amount of the light emitting unit LD may also be different, and the light emitting unit LD may also be other component such as a light emitting diode (LED) or so forth. In this embodiment, the light emitting units LD may respectively emit a light beam (B1, B2 and B3), and the light beams B1 to B3 are combined by the beam combining unit 120 after respectively passing through the lenses LN. Each light emitting unit LD may have a holding portion LH. For instance, in this embodiment, the holding portion LH may be an end of the light emitting unit LD (as illustrated in FIG. 1 and FIG. 2).

Moreover, the holders HD may be fixed at a side of the fixing base 110 and respectively hold the light emitting units LD, and each holder HD may have an accommodating indentation U for accommodating the corresponding light emitting unit LD. For instance, referring to FIG. 1 and FIG. 2, in this embodiment, a shape of the holders HD may be U-shaped or ∩-shaped, the light emitting units LD may be accommodated inside the U-shaped holders HD, but the invention is not limited thereto. Moreover, each holder HD may expose a holding portion LH of the corresponding light emitting unit LD in order to facilitate a subsequent adjustment. For instance, the accommodating indentation U of the holder HD may expose the holding portion LH.

In addition, the optical apparatus 100 may further include a casing T, which may be used to accommodate all or part of the aforementioned components. A shape of the casing T may be different according to actual needs, and may be manufactured with a material different from that of the fixing base 110 and the holders HD, but the invention is not limited thereto.

Figure 3:
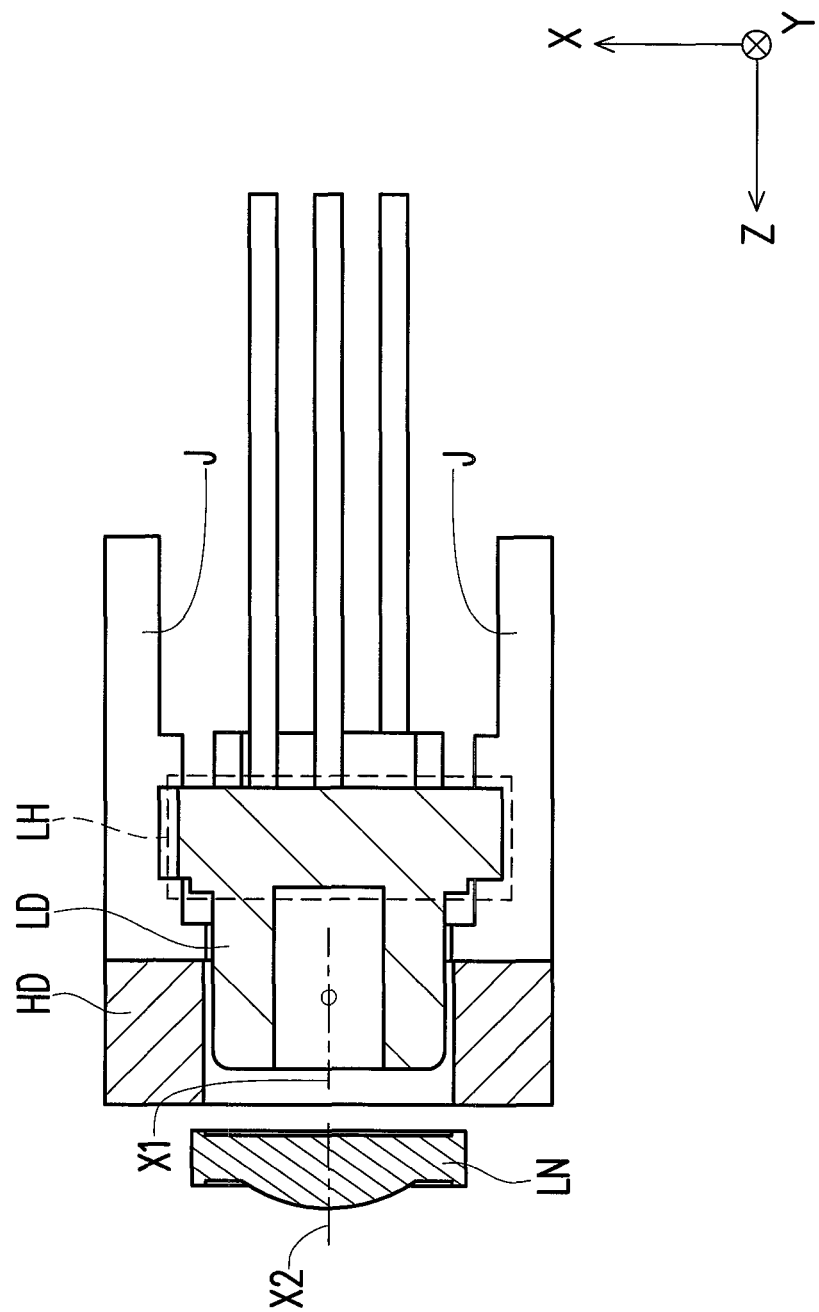
FIG. 3 is an adjustment schematic diagram illustrating a jig of the optical apparatus according to the embodiment depicted in FIG. 1.

FIG. 3 is an adjustment schematic diagram illustrating a jig of the optical apparatus according to the embodiment depicted in FIG. 1. Referring to FIG. 1 through FIG. 3, in this embodiment, the light emitting unit LD and holder HD have a space therebetween and are available for performing a vertical adjustment (displacement adjustment along a Z-axis direction). When performing the adjustment, the jig J holds the holding portion LH of the light emitting unit LD, and may respectively adjust each light emitting unit LD until an overlapping degree of the light beams B (e.g., light beams B in FIG. 1 include light beams B1 to B3 respectively emitted by the light emitting units LD1 to LD3) emitted by the light emitting units LD matches a preset requirement. Details regarding the preset requirement are to be described later in the subsequent content.

A horizontal adjustment (displacement adjustment on a X-Y-axes plane) may be firstly performed before performing the vertical adjustment; in detail, the jig J may hold the light emitting units LD respectively disposed inside the holders HD, and the jig J may adjust X-Y-axes positions of the light emitting units LD by moving, and thereby drives the holders HD to perform the displacement adjustment on the X-Y-axes plane. After the horizontal adjustment is done, the holders HD are fixed on the fixing base 110, and the vertical Z-axis adjustment of the light emitting units LD may further be performed. Since the holders HD and the lenses LN are already fixed on the fixing base 110, the original process for adjusting an assembly of the beam combining unit 120, the lenses LN and the light emitting units LD is not needed so that only using the jig J to adjust the light emitting units LD is required. As such, a precision of the fixing base 110 may be used to maintain an alignment precision of the light beams B as well as to enhance an efficiency of the assembly.

In detail, in this embodiment, the lenses LN may be a plurality of light collimators, and the light collimators respectively collimate the light beams B1 to B3 from the light emitting units LD. The beam combining unit 120 may include a plurality of beam splitters DC1 to DC3 respectively disposed on transmission paths of the light beams B1 to B3 from the lenses LN. In this embodiment, inclination angles and positions of the lenses LN and the beam combining unit 120 disposed on the fixing base 110 with respect to the light beams B1 to B3 may be fixed with the manufacturing precision of the fixing base 11 when the fixing base 11 was made. In other words, when manufacturing the fixing base 110, the inclination angles and the positions of the lenses LN and the beam combining unit 120 may be designed with respect to the light beams B1-B3 according to the actual needs, such that the time for adjusting the optical paths during the assembly may be saved, and the assembly efficiency as well as the assembly quality may also be enhanced.

In this embodiment, the light beams B1, B2 and B3 respectively emitted by the light emitting units LD1, LD2 and LD3 may become collimated after passing through the lenses LN, and the collimated light beams B1, B2 and B3, after being correspondingly reflected by beam splitters DC1, DC2 and DC3, are transmitted towards a same direction while approaching each other. Furthermore, the light emitting units LD1 to LD3 may respectively emit the light beams B1 to B3 of different colors, the beam splitters DC1 to DC3 are a plurality of color filter components, and the color filter components respectively reflect the light beams B1 to B3 of corresponding colors and let through the light beams B1 to B3 of the other colors. In other words, the light emitting units LD1, LD2 and LD3 may respectively emit light of different colors (e.g., red, blue and green), and the beam splitters DC1 to DC3 may be dichroic filters and may respectively reflect the light beams B1 to B3 of corresponding colors. In this embodiment, the beam splitter DC1, for example, may reflect red light and let the light of other colors to pass through the dichroic filter, the beam splitter DC2, for example, may reflect blue light and let the light of other colors to pass through the dichroic filter, and the beam splitter DC3, for example, may reflect green light and let the light of other colors to pass through the dichroic filter, but the invention is not limited thereto. As such, in this embodiment, the light beams B1 to B3 may be collimated and may nearly be parallel coaxial after being reflected, and are conductive to providing light sources with precision and ideal light spot coincidence so as to enhance a resolution and an image quality of the optical apparatus.

Figure 4A:
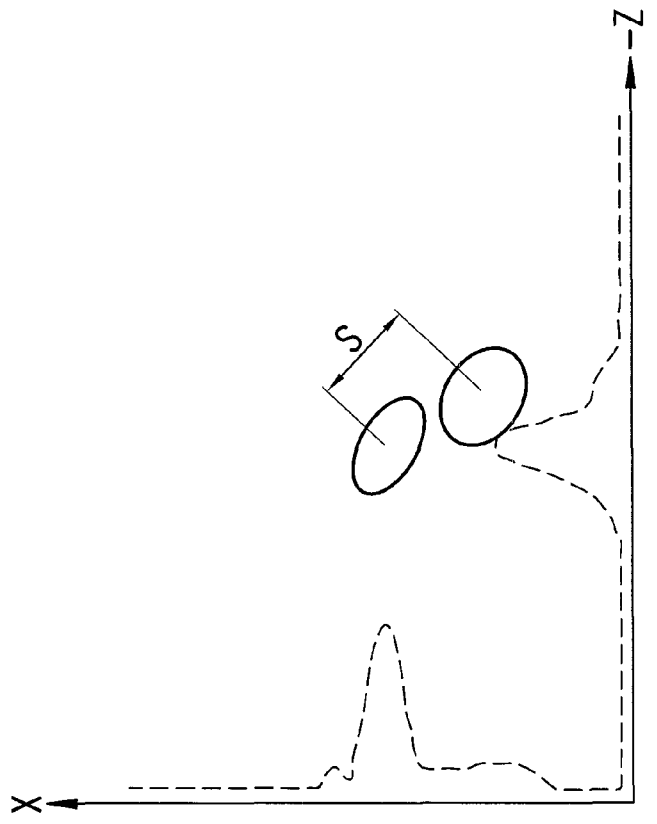
FIG. 4A and FIG. 4B are light spots schematic diagram illustrating projections of light beams on a reference plane according to the embodiment depicted in FIG. 1.
Figure 4B:
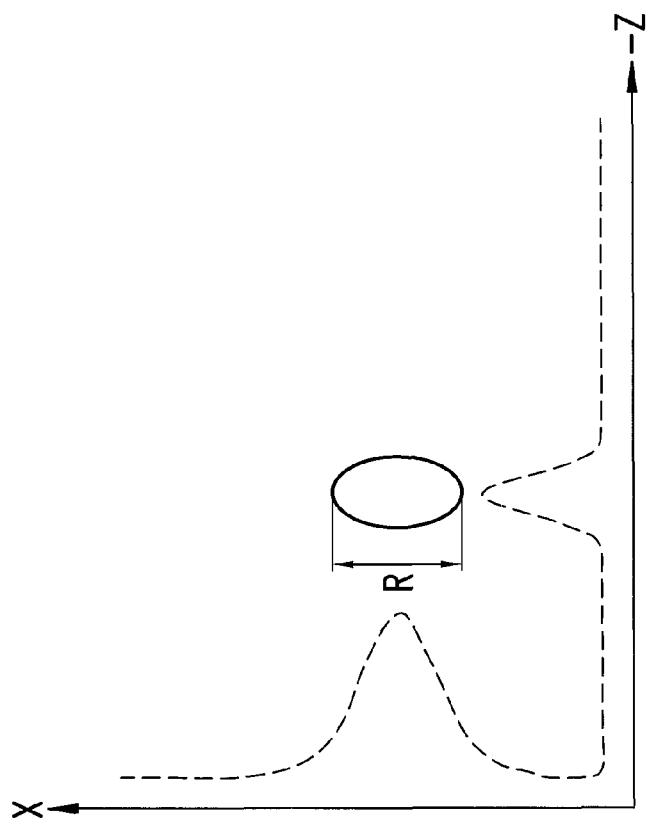

In more detail, FIG. 4A and FIG. 4B are light spots schematic diagram illustrating projections of light beams on a reference plane according to the embodiment depicted in FIG. 1. Referring to FIG. 1 through FIG. 4B, wherein a diameter of the lenses LN is D, a distance from the lenses LN to the beam combining unit 120 is L, and a relationship between the lenses LN and the beam combining unit 120 may satisfy:

$$L < \frac{D}{2}.$$

Moreover, in this embodiment, a light spot diameter R of the light spots PJ1 to PJ3 projected on the reference plane RP by the light beams B1 to B3, and a distance S between each of the light spots PJ1 to PJ3, satisfy the following preset requirement:

S≤80 micrometers; and
R≤150 micrometers.

As such, the optical apparatus 100 may have precisely calibrated projection light sources and ideal projection resolution, and is easy in assembling as well as adjusting the alignment of light beams.

Figure 5:
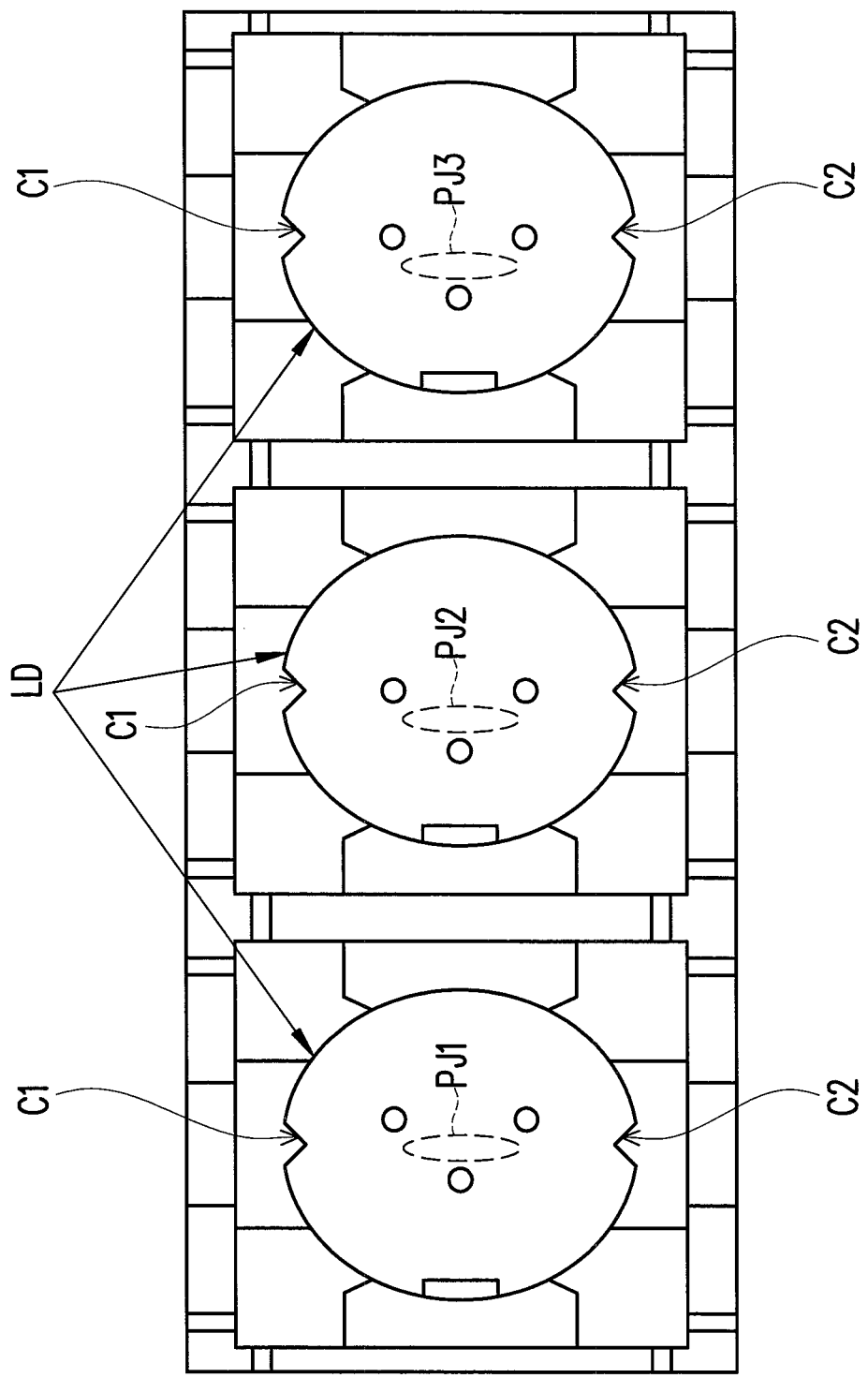
FIG. 5 is a side view diagram of the optical apparatus according to the embodiment depicted in FIG. 1.

Furthermore, FIG. 5 is a side view diagram of the optical apparatus according to the embodiment depicted in FIG. 1. Referring to FIG. 1 through FIG. 5, in this embodiment, the light beams B1 to B3 are polarized light, and the light spots PJ1 to PJ3 are elliptical. For instance, in this embodiment, when the light emitting units LD1 to LD3 are laser diodes, the light beams B1 to B3 are elliptical polarized light. In this embodiment, for an ease of assembly, each laser diode may has a concave groove C1 and a concave groove C2 at a side for corresponding to a long axis direction (or may be corresponding to a short axis direction) of the elliptical polarized light. In other words, a connecting direction of the concave grooves C1 and C2 is namely the long axis direction of the polarized light. The concave grooves C1 and C2 may be disposed on the holding portion LH depicted in FIG. 2. In this embodiment, with the holding of the jig J, the long axis directions of the light beams B1 to B3 may together be aligned when performing the horizontal or vertical adjustment, thereby may further enhancing the precision of alignment and reducing the distances between the light spots PJ1, PJ2 and PJ3, so as to enhance the resolution. During the adjustment, one or more jigs equal to the amount of the light emitting units may be used to respectively hold the separate light emitting unit. For example, when the amount of the light emitting unit is three, the amount of the jig are also three so as to be respectively corresponded to the different light emitting units, or by only using one jig to sequentially and separately adjust each light emitting unit.

In addition, in this embodiment, the optical apparatus 100 may further include a scanning mirror group MG and at least one reflector R. The scanning mirror group MG has at least one scanning mirror M. In this embodiment, an amount of the scanning mirror M, for example, is 1, and an amount of the reflector R, for example is 2, but the invention is not limited thereto. The reflectors R and the scanning mirror M are disposed on the transmission paths of the light beams B combined by the beam combining unit 120. Moreover, the reflectors R are located between the beam combining unit 120 and the scanning mirror M, so as to reflect the light beams B to the scanning mirror M. Then, a plurality of light spots PJ1 to PJ3 formed on the scanning mirror group MG by the light beams B are close to each other, wherein the scanning mirror M may enable the light beams B to scan an image surface IM by changing angles θ. For instance, the scanning mirror group MG may be a mirror group having a micro electro mechanical system (MEMS) that may change an inclination angle of the mirror group by the control of a current or voltage signal, so that the light beams B can be projected with different projection angles θ, wherein the angles θ are defined between light beams Bo projected on to an image surface IM with a preset projection direction and light beams B projected on to the image surface IM. However, the amounts of the angles θ, the reflectors R and the scanning mirror M mentioned above are only provide as an example for explaining this embodiment, and the invention is not limited thereto.

Figure 6:
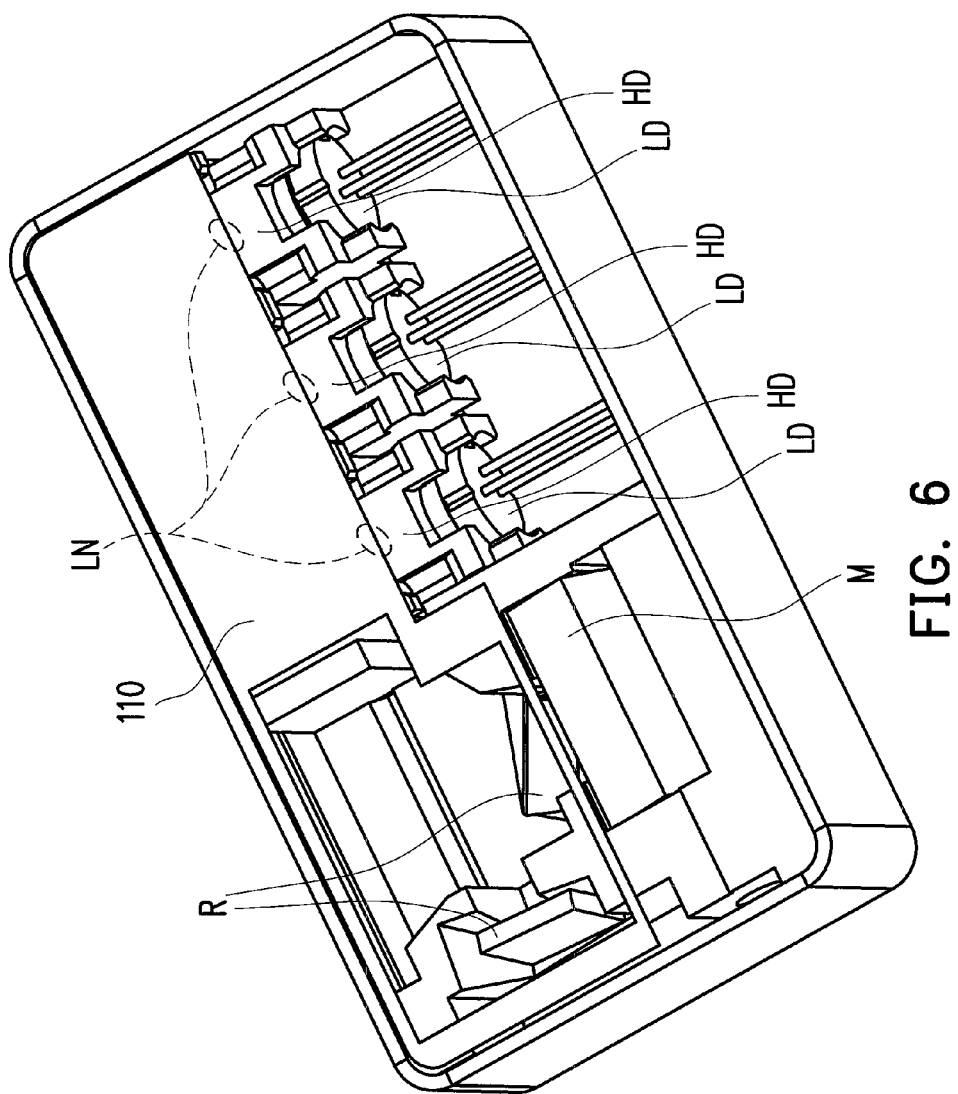
FIG. 6 is a schematic diagram illustrating a variation of the optical apparatus according to the embodiment depicted in FIG. 1.

In addition, FIG. 6 is a schematic diagram illustrating a variation of the optical apparatus according to the embodiment depicted in FIG. 1. Referring to FIG. 6, wherein the reflectors R may further be fixed on the fixing base 110; namely, the lenses LN, the holders HD and the reflectors R may be integrated by using the fixing base 110. Moreover, materials of the fixing base 110 and holders HD may be metal, so that a heat dissipation efficiency and a structural strength of the optical apparatus 100 may be enhanced for adapting to various applications.

Figure 7:
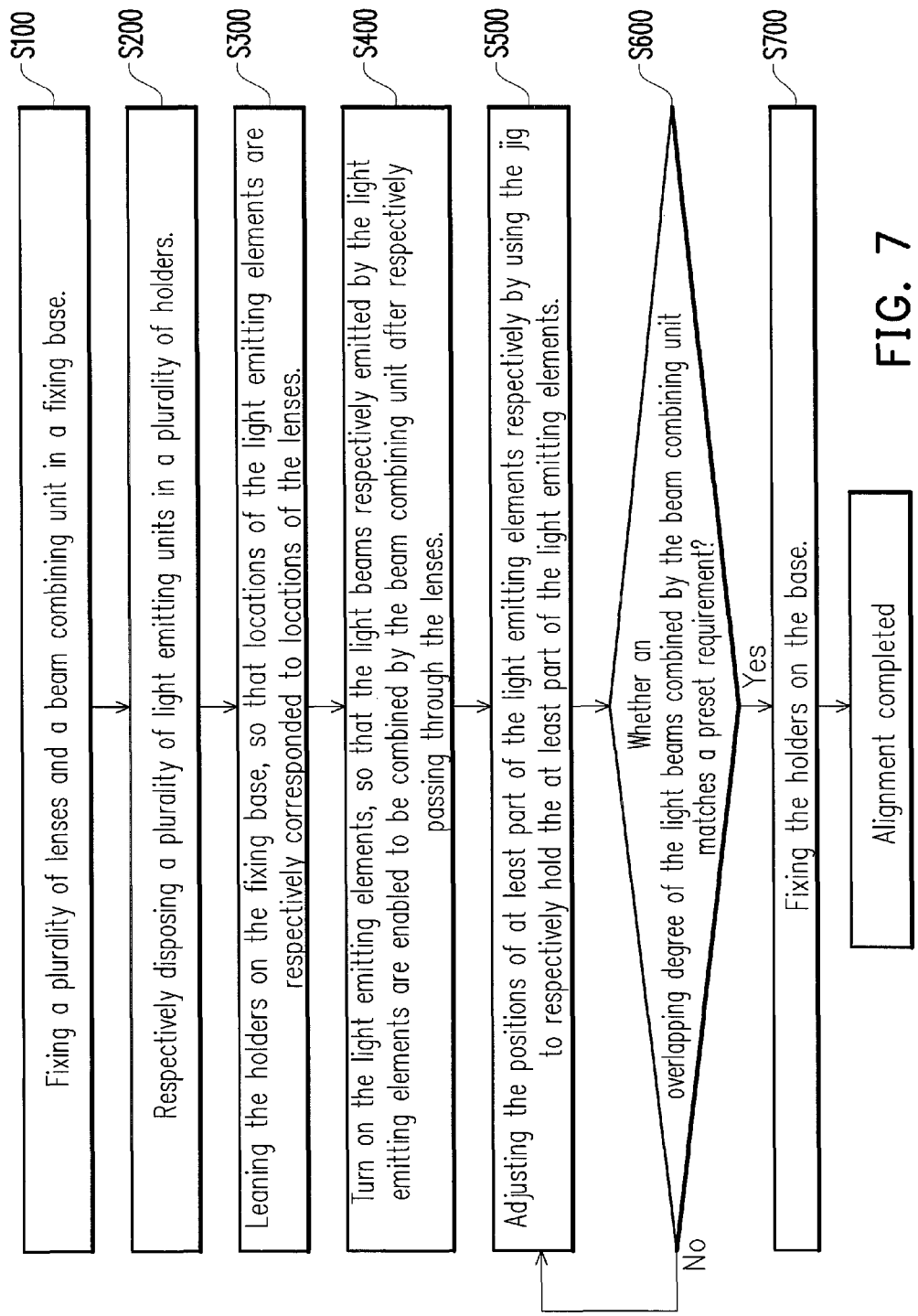
FIG. 7 is a flow chart diagram of an aligning method according to an embodiment of the invention.

FIG. 7 is a flow chart diagram of an aligning method according to an embodiment of the invention. Referring to FIG. 7, in this embodiment, an apparatus for implementing the aligning method may be referred to the optical apparatus of the embodiments illustrated in FIG. 1 through FIG. 6, and the aligning method may include the following steps. Fixing a plurality of lenses LN and a beam combining unit 120 in a fixing base 110 (step S100). Respectively disposing a plurality of light emitting units LD1 to LD3 in a plurality of holders HD (step S200). The holding method, the parts being hold and the jig J being used may be referred to the contents in the embodiments illustrated in FIG. 1 through FIG. 6, and thus are not repeated herein. Next, leaning the holders HD on the fixing base 110, so that locations of the light emitting units LD1 to LD3 are respectively corresponded to locations of the lenses LN (step S300). Turn on the light emitting units LD1 to LD3, so that the light beams B1 to B3 respectively emitted by the light emitting units LD1 to LD3 are enabled to be combined by the beam combining unit 120 after respectively passing through the lenses LN (step S400). Adjusting the positions of at least part of the light emitting units LD1 to LD3 respectively by using the jig J to respectively hold the at least part of the light emitting units LD1 to LD3 (step S500). In addition, determining an overlapping degree of the light beams B1 to B3 combined by the beam combining unit 120 and deciding whether it matches a preset requirement (step S600); if it does not match the preset requirement, then continues to return to the step S500 to adjust the positions of the light emitting units LD1 to LD3 until the overlapping degree of the light beams B1 to B3 combined by the beam combining unit 120 matches the preset requirement, and thereby, the alignment is completed. Benefits of the aligning method and the detail descriptions of the apparatus may be referred to the embodiments illustrated in FIG. 1 through FIG. 6, and thus are not repeated herein. As such, the process and a difficulty of alignment may be simplified while still maintaining ideal alignment precision, thereby further enhancing an assembly efficiency as well as lowering a production cost.

In detail, the step of adjusting the position of any light emitting unit in the at least part of the light emitting units (step S500) includes at least one of a vertical adjustment and a horizontal adjustment. The vertical adjustment is to use the jig J to adjust a position of the light emitting unit LD within the corresponding holder HD so as to adjust a distance between the light emitting unit LD and the corresponding lens LN. In other words, the vertical adjustment is as the method of adjusting along the Z-axis direction illustrated in FIG. 3. The horizontal adjustment is to use the jig J to hold the light emitting unit LD to adjust an offset of an optical axis X1 of the light emitting unit LD with respect to an optical axis X2 of the corresponding lens LN, so that the light emitting unit LD drives the corresponding holder HD and causes the corresponding holder HD to glide on the fixing base 110. The apparatus details and the descriptions of the horizontal adjustment and the vertical adjustment may be referred to the embodiments illustrated in FIG. 1 through FIG. 6, and thus are not repeated herein.

In more detail, in this embodiment, each light emitting unit LD may have a holding portion HD. Moreover, the method of respectively adjusting the positions of the at least part of the light emitting units LD by using the jig J (step S500) may include using the jig J to respectively hold the holding portions LH of the light emitting units LD, and the method of adjusting the position of any light emitting unit LD in the at least part of the light emitting units LD is achieved by moving the corresponding jig J. As such, the light emitting units LD may respectively have different positions with respect to the fixing base 110, so as to attain an objective of aligning the light beams B1 to B3. Wherein, the apparatus details and the descriptions of the jig J and the holding portion LH may be referred to the embodiments illustrated in FIG. 1 through FIG. 6, and thus are not repeated herein.

In addition, in this embodiment, the lenses LN may be a plurality of light collimators, and the light collimators respectively collimate the light beams B1 to B3 from the light emitting units LD1 to LD3. Moreover, a diameter of the lenses LN is D, a distance from the lenses LN to the beam combining unit 120 is L, and a relationship between the lenses LN and the beam combining unit 120 satisfies:

$$L < \frac{D}{2}.$$

Moreover, the beam combining unit 120 may include a plurality of beam splitters DC1 to DC3 respectively disposed on transmission paths of the light beams B1 to B3 from the lenses LN. If the light emitting units LD1 to LD3 may respectively emit the light beams B1 to B3 of different colors (such as the light beams B1 to B3 illustrated in FIG. 1), then the beam splitters DC1 to DC3 are a plurality of color filter components, and the color filter components respectively reflect the light beam of corresponding colors and let through the light beams of other colors. Wherein, the apparatus details and the descriptions may be referred to the embodiments illustrated in FIG. 1 through FIG. 3, and thus are not repeated herein.

Furthermore, in this embodiment, the aligning method may further includes deciding whether the overlapping degree of the light beams B combined by the beam combining unit 120 matches the preset requirement by determining the overlapping degree of a plurality of light spots PJ1 to PJ3 respectively projected on a reference plane RP by the light beams B combined by the beam combining unit 120. Herein, the preset requirement may be referred to the preset requirement described in the embodiments illustrated in FIG. 4A through FIG. 4B, and thus is not repeated.

When the overlapping degree of the light beams B combined by the beam combining unit 120 matches the preset requirement, the aligning method further includes fixing the holders HD on the fixing base 110 (step S700), and respectively fixing the light emitting units LD1 to LD3 within the holders HD. The fixing method is, for example, an adhesive dripping or other adhering methods, for fixing the position aligned light emitting units LD1 to LD3.

Furthermore, the light emitting units LD1 to LD3 may be laser diodes, the light beams B1 to B3 may be polarized light beams, and the light spots PJ1 to PJ3 formed by the light beams B1 to B3 on reference plane RP are elliptical. The apparatus details, the adjustment method and the descriptions may be referred to the embodiments illustrated in FIG. 1 through FIG. 6, and thus are not repeated herein. Noteworthily, the sequential order of the reference numerals S100 to S600 of the aforementioned steps is only provided as an example for the description purpose, and the invention is not limited thereto.

In summary, the aligning method in the embodiment of the invention uses the jig to respectively hold the light emitting units and respectively adjusts the positions of the light emitting units within the holders, so that the light beams emitted by the light emitting units satisfy the preset requirement. Moreover, the procedure and process required for the alignment are simplified by fixing the beam combining unit, the lenses and the holders on the fixing base. Furthermore, in the optical apparatus of the embodiment of the invention, since each holder exposes the holding portion of the corresponding light emitting unit, the jig may hold the holding portion of the light emitting unit so as to adjust the position of the light emitting unit, so that the optical alignment process may be simplified while still maintaining ideal alignment precision. In addition, the optical apparatus in the embodiments of the invention may also improve a condition of heat dissipation via the holders and the fixing base that are made of metal materials and in contact with the light emitting units.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An optical apparatus comprising:
    a fixing base;
    a plurality of light emitting units emitting a plurality of light beams, wherein each light emitting unit has a holding portion; and
    a plurality of holders respectively holding the light emitting units, each holder having an accommodating indentation for accommodating the corresponding light emitting unit, and the accommodating indentation of each holder exposing the holding portion of the corresponding light emitting unit,
    wherein a jig holds the exposed holding portion and adjusts the position of the holder and the light emitting unit before the holder is fixed to the fixing base, adjusts the position of the light emitting unit within the holder after the holder is fixed to the fixing base and then the light emitting unit is fixed to the holder.

2. The optical apparatus as recited in claim 1, wherein the optical apparatus further comprises a plurality of lenses fixed on the fixing base, wherein the lenses are a plurality of light collimators, and the light collimators collimate the light beams from the light emitting units.

3. The optical apparatus as recited in claim 2, wherein a diameter of the lenses is D, a distance from the lenses to a beam combining unit fixed on the fixing base is L, and a relationship between the lenses and the beam combining unit satisfies:

$$L < \frac{D}{2}.$$

4. The optical apparatus as recited in claim 1, wherein the optical apparatus further comprises a beam combining unit fixed on the fixing base and the beam combining unit comprises a plurality of beam splitters respectively disposed on transmission paths of the light beams from a plurality of lenses.

5. The optical apparatus as recited in claim 4, wherein the light emitting units emit light beams of different colors, the beam splitters are a plurality of color filter components, and the color filter components respectively reflects the light beam of corresponding color and let through the light beams of other colors.

6. The optical apparatus as recited in claim 1 further comprising a scanning mirror group having at least one scanning mirror, wherein the scanning mirror is disposed on transmission paths of the light beams combined by a beam combining unit, the light beams formed a plurality of light spots on the scanning mirror group, wherein the scanning minor enables the light beams to scan an image surface by changing angles.

7. The optical apparatus as recited in claim 6 further comprising at least one reflector disposed on the transmission paths of the light beams combined by the beam combining unit and located between the beam combining unit and the scanning mirror, so as to reflect the light beams to the scanning minor.

8. The optical apparatus as recited in claim 7, wherein the reflector is fixed on the fixing base.

9. The optical apparatus as recited in claim 1, wherein the light beams are polarized light and the light spots projected out of the optical apparatus on a reference plane are elliptical.

10. The optical apparatus as recited in claim 1, wherein materials of the fixing base and the holders are metal.

11. The optical apparatus as recited in claim 1, wherein the light emitting unit has two concave grooves disposed on the holding portion and the connecting direction of the concave grooves is corresponding to a long or a short axis direction of the elliptical light spot.

12. The optical apparatus as recited in claim 1, wherein the holder is U-shaped or ∩-shaped.

13. The optical apparatus as recited in claim 1, wherein the jig adjusts an offset of an optical axis of the light emitting unit with respect to an optical axis of a corresponding lens before the holder is fixed to the fixing base, and then adjusts a distance between the light emitting unit and the corresponding lens after the holder is fixed to the fixing base.

* * * * *